Patented Nov. 15, 1927.

1,649,669

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

HEXYLYL RESORCINOL.

No Drawing.   Application filed April 29, 1925. Serial No. 26,816.

This invention relates to normal hexylyl resorcinol having the following formula $C_6H_3(OH)_2COC_5H_{11}$.

The normal hexylyl resorcinol may be prepared by acting on resorcinol with caproic acid in the presence of a condensing agent, such as zinc chloride, at an elevated temperature.

The normal hexylyl resorcinol can be produced, for example, by the process of the following specific example:

20 parts of anhydrous zinc chloride are dissolved in 100 parts of normal caproic acid, the solution being aided by heating and stirring. While the temperature is maintained near 135° C., 33 parts of resorcinol are gradually added over a period of about 20 minutes and the reaction mixture is then stirred for a period of about three hours at a temperature of about 135 to 145° C. At the end of this time an equal volume of water is added and the mixture is further stirred. The oily reaction product rises to the surface, is separated from the aqueous layer, and washed with an equal volume of water and the water then separated from the washed product. The washed product is then distilled in vacuo; the traces of water and the excess normal caproic acid being first distilled off, and finally the hexylyl resorcinol distills over.

The hexylyl resorcinol may be further purified by redistillating and crystallization from a mixture of toluene and petroleum ether. On redistillation the distillate solidifies giving a product of melting point around 52–55° C. Normal hexylyl resorcinol, when crystallized from toluene-petroleum ether, has a melting point of 54.5 to 56° C. The hexylyl resorcinol has a boiling point of about 208–215° C. at 12 mm. pressure and about 195–200° C. at 8 mm. pressure.

The normal hexylyl resorcinol may be produced in a crystalline state, or in a less pure form, as an oil, which may then be used to prepare other compounds without purification, such as, for example, the normal hexyl resorcinol by reduction.

This application is a continuation in part of my prior application Serial No. 654,928, filed July 31, 1923.

I claim:

1. A new product comprising normal hexylyl resorcinol having the following formula

$C_6H_3(OH)_2.CO.CH_2.CH_2.CH_2.CH_2.CH_3$.

2. As a new product pure normal hexylyl resorcinol having the following formula $C_6H_3(OH)_2.CO.CH_2.CH_2.CH_2.CH_2.CH_3$: being a crystalline solid having a melting point of about 54.5 to 56° C. and boiling at about 195 to 200° C. at 8 mm. pressure.

In testimony whereof I affix my signature.

ALFRED R. L. DOHME.